United States Patent [19]  
Yamauti et al.

[11] 3,929,115
[45] Dec. 30, 1975

[54] MEANS FOR CLEANING EXHAUST GAS IN A RECIPROCATING PISTON TYPE AUTOMOBILE ENGINE

[75] Inventors: Teruo Yamauti; Yoshishige Oyama, both of Hitachi; Yukio Hohsho, Katsuta, all of Japan

[73] Assignee: Hitachi, Ltd., Japan
[22] Filed: Mar. 16, 1973
[21] Appl. No.: 341,847

[30] Foreign Application Priority Data
Mar. 17, 1972 Japan.............................. 47-27288

[52] U.S. Cl..... 123/148 R; 123/148 C; 123/148 DS
[51] Int. Cl.²........................................... F02P 1/00
[58] Field of Search ....... 123/52 M, 148 R, 148 DS, 123/148 C, 55 A

[56] References Cited
UNITED STATES PATENTS

| | | | |
|---|---|---|---|
| 3,141,449 | 7/1964 | Dika................................ | 123/52 M |
| 3,422,803 | 1/1969 | Stivender....................... | 123/90.16 |
| 3,554,092 | 1/1971 | Shibagaki..................... | 123/148 DS |
| 3,584,608 | 6/1971 | Shibagaki..................... | 123/148 DS |
| 3,626,909 | 12/1971 | Hayashida..................... | 123/148 DS |
| 3,716,991 | 2/1973 | Tatsutomi et al............. | 123/148 DS |
| 3,776,212 | 12/1973 | Karlowitz ....................... | 123/32 SP |
| 3,809,042 | 5/1974 | Hosho et al.................. | 123/148 DS |
| 3,828,747 | 8/1974 | Nambo......................... | 123/122 AC |

*Primary Examiner*—Charles J. Myhre
*Assistant Examiner*—Paul Devinsky
*Attorney, Agent, or Firm*—Craig & Antonelli

[57] ABSTRACT

Means for cleaning exhaust gas in a reciprocating piston type automobile engine comprising fuel supply means for supplying a lean fuel-air mixture, means provided downstream of the fuel supply means for sufficiently atomizing the supplied fuel, primary and auxiliary ignition plugs provided in each engine combustion chamber, and means for determining the ignition timing of the auxiliary plug 0° to 25° different from that of the primary plug in accordance with the operating condition of engine.

9 Claims, 4 Drawing Figures

MEANS FOR CLEANING EXHAUST GAS IN A RECIPROCATING PISTON TYPE AUTOMOBILE ENGINE

The present invention relates to means for reducing noxious constituents in automobile exhaust gas, and more particularly to means for reducing noxious constituents in exhaust gas from a reciprocating piston type automobile engine.

It is well known that the composition of engine exhaust gas remarkably changes in accordance with the air-fuel ratio of the combustible mixture supplied to the engine. With a fuel rich mixture, an increased amount of CO and HC hydrocarbons are exhausted; while with a relatively lean mixture, such as a mixture having the air-fuel ratio of about 17, the amount of $NO_x$ is remarkably increased. CO and HC constituents are produced due to an imperfect combustion in an engine cylinder so that it is possible to decrease the amount of these constituents by increasing the efficiency of combustion. On the other hand, the amount of $NO_x$ increases as the efficiency of combustion in an engine is increased. Further, it has been known that the amount of HC and CO as well as that of $NO_x$ could be decreased if an engine could be stably operated with a lean mixture of the air-fuel ratio of more than 18.

However, in a known practical reciprocating piston type engine, the air-to-fuel ratio must be maintained below 18 due to the fact that the supplied fuel is only partially atomized and that the fuel-air mixture cannot be uniform throughout a cylinder. Further, the performance of an ignition plug may also be a factor for limiting the maxium air-to-fuel ratio. With a lean mixture having the air-to-fuel ratio exceeding 18, frequent misfiring may occur causing an instable operation of engine. Thus, the amounts of HC and CO in the exhaust gas are undesirably increased and the engine output is remarkably decreased.

The present invention has an object to provide means for reducing noxious constituents in engine exhaust gas, in which the amount of $NO_x$ in the exhaust gas can be substantially decreased without any increase in the amount of other noxious constituents such as HC and CO, and without any decrease in engine output.

Another object of the present invention is to provide means for reducing noxious constituents in engine exhaust gas, which further contributes to an economical engine operation of low fuel consumption.

A further object of the present invention is to provide means for reducing noxious constituents in engine exhaust gas, which can reduce noxious constituents without sacrificing engine acceleration performance.

According to the present invention, an engine is provided with fuel supply means such as a carburetor for supplying a lean fuel air mixture having air-to-fuel ratio of 18 to 23, means are provided on the downstream side of the fuel supply means for sufficiently atomizing the supplied fuel, and primary and auxiliary ignition plugs are provided in each engine cylinder, means being provided for determining the timing of the energization of the auxiliary ignition plug, which is different by 0° to 25° from that of the primary igniton plug in accordance with the operating condition of the engine.

The above and other objects and features of the invention will become apparent from the following descriptions of the invention with respect to a preferred embodiment shown in the accompanying drawings, in which.

Figure 1:
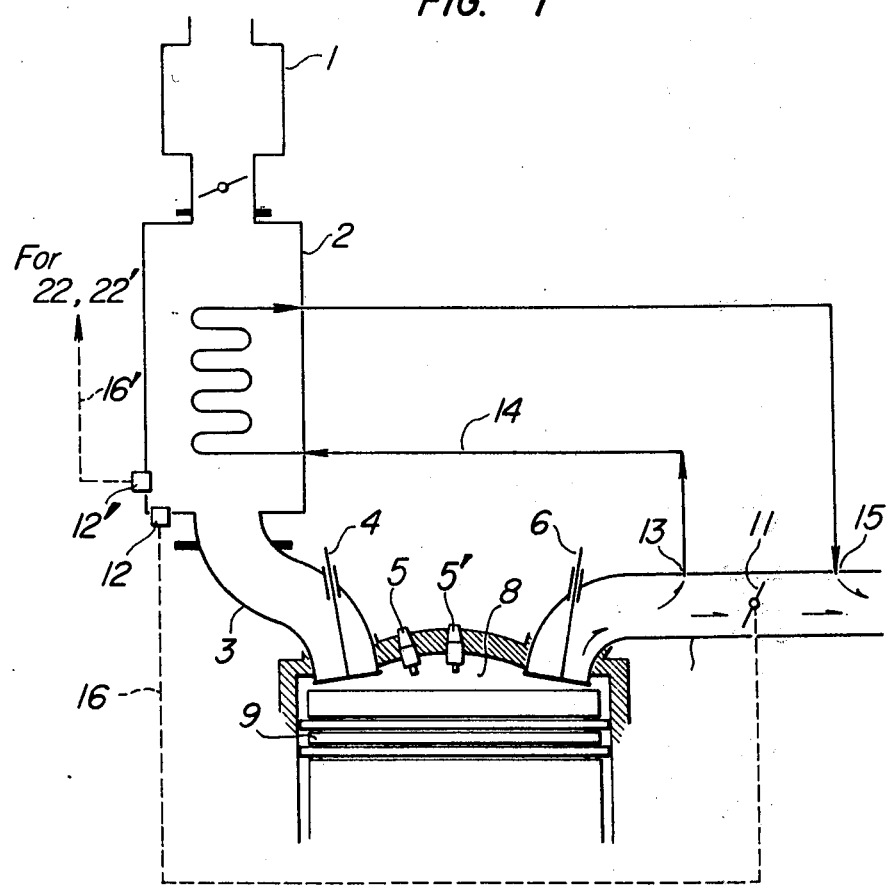
FIG. 1 is a schematic view of an engine exhaust gas cleaning system showing an embodiment of the present invention.

Referring now to the drawings, particularly to FIG. 1 which schematically shows an embodiment of the present invention, the reference numeral 1 designates a carburetor for supplying fuel in a form of finely divided liquid particles. The fuel is mixed with air and atomized by atomizing means 2 which utilizes the heat of engine exhaust gas. The atomized fuel is then drawn together with the intake air through an intake pipe 3 and an intake valve 4 into a combustion chamber 8 to be ignited by a primary ignition plug and an auxiliary ignition plug 5'. The carburetor 1 is so adjusted that it supplies the fuel in accordance with the amount of the intake air so as to form a fuel-air mixture having an air-to-fuel ratio of 18 to 23. For this purpose, the carburetor may have a fuel metering jet which is smaller in diameter than that of a conventional carburetor. The combustion product produced in the combustion chamber 8 is exhausted through an exhaust valve 6 into an exhaust pipe 7. The reference numeral 9 designates a piston. The exhaust pipe 7 has a butterfly type valve 11 provided therein for dividing the exhaust gas into two parts, one being directed through a take-out port 13 and a heating pipe 14 into the atomizing means 2 for heat exchange with the intake mixture and then returned through an exit port 15 into the exhaust pipe 7 to be exhausted into the atmosphere.

The valve 11 is connected through a linkage 16 with a heat-sensible member 12 which is mounted on the atomizing means 2 and adapted to be deformed in accordance with the temperature in the atomizing means 2 so as to serve to actuate the valve 11 through the linkage 16. When it is sensed by the heat-sensible member 12 that the temperature of the atomizing means 2 is low, the member 2 acts through the linkage 16 on the valve 11 to close it, so that an increased amount of exhaust gas is introduced into the heating pipe 14. By suitably selecting the operating characteristics of the heat sensible member 12, it becomes possible to attain a perfect or substantially perfect atomization of fuel. Thus, the air-to-fuel ratio can be readily maintained between 18 to 23. A further heat sensitive member 12' is provided on the atomizing means and connected through a linkage 16' to an ignition timing board (not shown) in distributors 22 and 22' of an ignition timing control mechanism. Thus, the member 12' detects the temperature in the fuel atomizing means and serves to adjust contacts 21 and 21' of the distributors 22 and 22' so as to advance the ignition timing as the temperature increases and retard as the temperature decreases. From the above, it will be clear that a heat sensitive spark advance mechanism is provided by the above arrangement.

Figure 2:
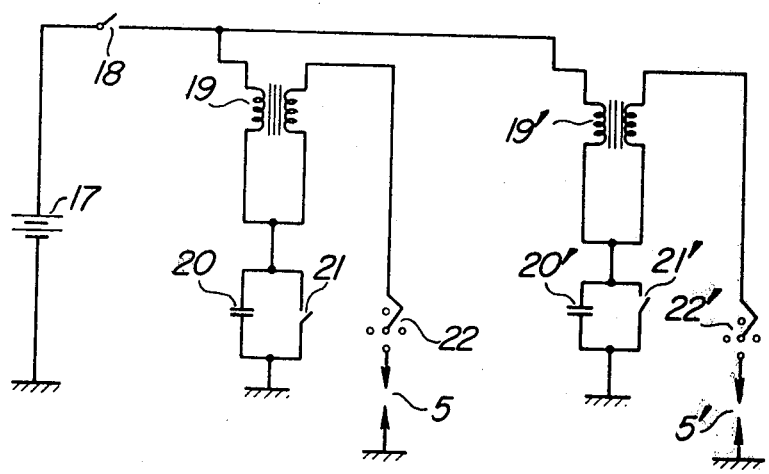
FIG. 2 is a circuit diagram of the ignition system employed in the arrangement shown in FIG. 1.
Figure 3:
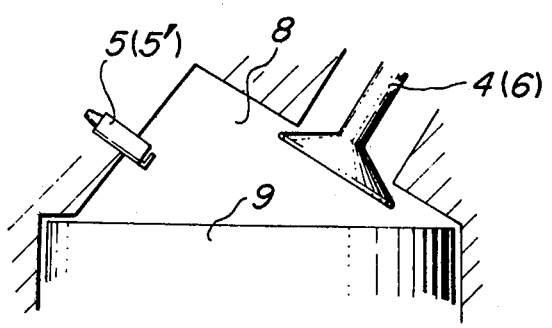
FIG. 3 is a schematic diagram showing the installation of ignition plugs.

Referring to FIG. 2, there is shown an example of ignition circuit incorporating such an ignition timing control mechanism. The circuit includes ignition coils 19 and 19' which are parallely connected with a battery 17 and an ignition switch 18. As in a known arrangement, each of the ignition coils 19 and 19' is connected with a capacitor 20 or 20' and a contact 21 or 21' which are in turn connected in parallel relation with each other. Each of the ignition coils 19 and 19' has a secondary winding which is grounded at one end and connected through the distributor 22 or 22' to a primary ignition plug 5 or to an auxiliary ignition plug 5' as the case may be. The contacts 21 and 21' are intermittently opened in accordance with engine rotation by means of cam mechanisms as is well known in the art. The adjustment is such that the operation of the contact 21' is retarded from that of the contact 21 by an angle between 0° to 25° of crank angle. The distributors 22 and 22' may have, in addition to the above heat sensitive spark advance mechanism, a spark advance mechanism including a pair of co-axial cams which are positions in correspondence with particular engine speeds, and a pair of governor weights having different spark advance characteristics and adapted to co-operate respectively with said cams. Further, the spark advance mechanism may comprise a known electrical means.

The primary and auxiliary ignition plugs 5 and 5' may be installed on the cylinder at appropriate positions in accordance with the configuration of the combustion chamber, however, in a preferred arrangement, the primary ignition plug 5 is located at a position which is most suitable for initial combustion and the auxiliary ignition plug 5' is located at a position suitable for combustion in quench area.

It has been found that a satisfactory result can be obtained by positioning the primary ignition plug 5 at a side adjacent to the intake valve 4 and the auxiliary ignition plug 5' at a side adjacent to the exhaust valve.

In operation, the carburetor 1 supplies a fuel and air mixture which has an air-to-fuel ratio of between 18 to 23, and the atomizing means 2 serve to atomize the fuel in the mixture. In order to attain a sufficient atomization of fuel, the temperature in the atomizing means is controlled by actuating the butterfly valve 11 in accordance with the temperature in the atomizing means 2 by detecting the temperature by the heat sensitive memeber 12. The second heat sensitive member 12' serves to adjust the operation of the contacts in the distributors 22 and 22' so as to advance or retard the ignition timing in accordance with the temperature in the atomizing means whereby the timings of two ignition plugs in each engine cylinder are deviated by an angle between 0° to 25° crank angle. Thus, it becomes possible to obtain a stable engine operation with a lean air and fuel mixture having an air-to-fuel ratio of 18 to 23 with a remarkable reduction in the amount of $NO_x$.

During acceleration, an engine must provide an increased output. For this purpose, the timing of the auxiliary ignition operates during acceleration so that the auxiliary ignition plug is energized simultaneously with the primary ignition plug for providing an increased output while limiting the increase of noxious constituents in the exhaust gas to a minimum valve. The ignition timing of the auxiliary ignition plug may be advanced by a mechanical means which utilizes the negative pressure in the intake pipe for adjusting the angular position of the ignition timing board or by an electrical means which includes a time delay circuit which is brought into an inoperative position during acceleration.

Figure 4:
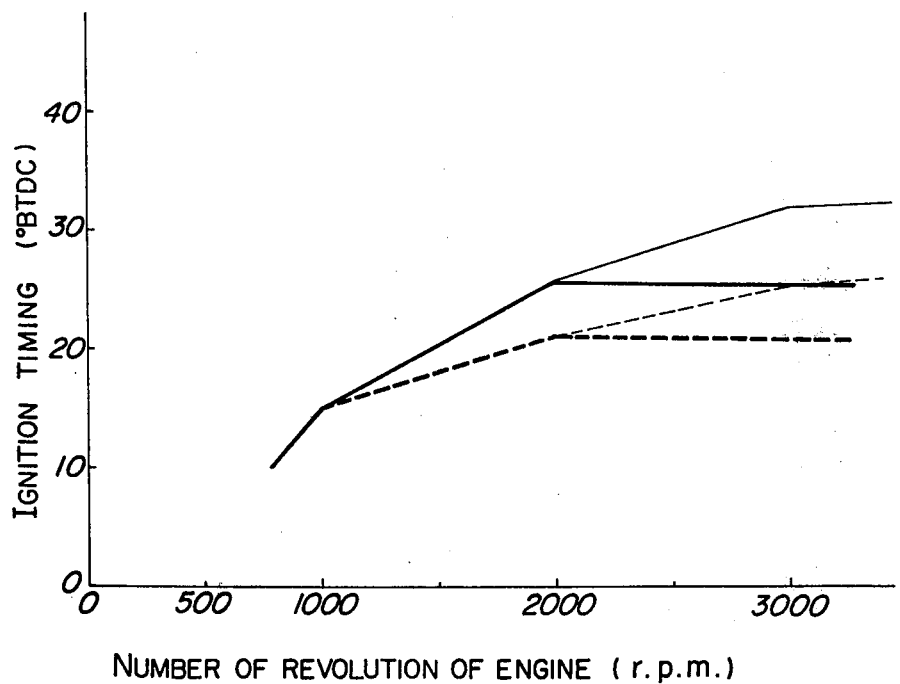
FIG. 4 is a diagram showing one example of spark advance in accordance with the present invention.

FIG. 4 shows an example of ignition time control. In the drawing, the solid line designates the ignition timing of the main spark plug and the broken line that of the auxiliary ignition plug. .It will be seen that with the engine speed lower than 1000 r.p.m. the rate of spark advance is the same in both of the main and the auxiliary spark plugs, however, under the engine speed higher than 1000 r.p.m. the timings of the spark plugs are progressively differentiated. With the engine speed exceeding 2000 r.p.m. the ignition timings are maintained constant in both of the ignition plugs with the difference of ignition timings of approximately 5°. In this instance, the mixing ratio is 19 at the idling speed and about 21 at the engine speed higher than idling speed. It should be noted that the rate of spark advance and the difference between the timings of the primary and auxiliary ignition plugs should be varied in accordance with the property of the engine. For example, as shown by thin lines in FIG. 4, the ignition timings may be advanced even under the engine speed exceeding 2000 r.p.m. and the difference between the ignition timing in the primary and auxiliary ignition plugs may be varied within the range between 5° and 25°. It is possible to decrease the amount of HC by designing an engine so that the valve overlap angle is between 0° and −5°. In a conventional reciprocating piston engine, there is commonly an overlap between the opening timing of an intake valve and that of an exhaust valve. However, in such an arrangement, a portion of the exhaust gas is introduced into the cylinder during the intake stroke, reducing the combustion flame propagation speed and thus increasing the amount of HC. When the overlap of the valve timings are determined as described above, the exhaust gas is not allowed to enter the combustion chamber and the amount of HC can be remarkably decreased.

If three or more ignition plugs are provided in a single cylinder, more reliable ignition can be assured, however, this arrangement is disadvantageous in respect of manufacturing cost and engine maintenance. In an arrangement in which two ignition plugs are provided in a single cylinder it would be effective in obtaining a reliable ignition under a relatively lean air-to-fuel ratio to have the ignition plugs energized simultaneously. However, it has been found that in this manner of operation, an increased amount of nitrogen oxide as well as HC are produced.

The invention has thus been shown and described with reference to preferred embodiment, however, it should be noted that the invention is in no way limited to the details of the illustrated structures but various changes and modification can be made without departing from the scope of the appended claims.

We claim:

1. Means for reducing noxious constituents in exhaust gas of a reciprocating piston type engine comprising fuel supply means for supplying relatively lean fuel air mixture having an air fuel ratio of 18 to 23, fuel atomizing means including heating means for sufficiently atomizing the fuel in the mixture supplied from said fuel supply means to a combustion chamber of the engine continuously in response to temperature changes in the fuel atomizing means, a primary and an auxiliary ignition plug disposed in each engine combustion chamber, and an ignition timing control mechanism varied in response to temperature changes in the fuel atomizing means for determining the ignition timing of the auxiliary ignition plug independently from that of the primary ignition plug, wherein said ignition timing control mechanism includes an advance mechanism which is operated in response to the engine speed, such that both of the ignition plugs are energized simultaneously under a relatively low engine speed while the ignition timing of the primary ignition plug is advanced under medium and high speed engine operation at a greater rate than that of the auxiliary ignition plug so that the difference between the timings of the ignition plugs is increased in response to the increase in the engine speed and wherein said ignition timing control mechanism is provided with an acceleration compensating mechanism for advancing the timing of the auxiliary ignition plug during engine deceleration.

2. Means in accordance with claim 1, in which said fuel atomizing means includes heat sensitive means and said ignition timing control mechanism has a heat sensitive ignition timing advance means, said heat sensitive means being operatively connected with said heat sensitive ignition timing advance means so that the timings of the plugs are advanced at greater extents as the temperature in the fuel atomizing means is increased.

3. Means in accordance with claim 2, in which said fuel atomizing means comprising a heating pipe provided in the path of the mixture, a control valve provided in the exhaust pipe or in the heating pipe for directing a portion of engine cooling water or exhaust gas so as to supply a sufficient amount of heat for atomizing the fuel in the mixture, said valve being actuated in accordance with the temperature in the fuel atomizing means.

4. Means in accordance with claim 2, in which the overlap of the opening timings of the intake and the exhaust valves is reduced to 0° to −5°.

5. Apparatus for cleaning the exhaust gas containing $NO_x$ compounds of reciprocating piston type internal combustion engines having at least one combustion chamber, said apparatus comprising:

fuel supply means for providing a lean fuel-air mixture having an air-fuel ratio in the range of about 18 to 23, atomizing means downstream of said fuel supply means for atomizing the lean fuel-air mixture and for supplying the lean mixture to said at least one combustion chamber, at least a first and a second variable timing ignition means, said ignition means being provided for said at least one combustion chamber, automatic means for varying the ignition timing of each of said ignition means independently of the other ignition means such that the ignition timings are differentiated so as to substantially reduce the $NO_x$ compounds present in the exhaust gas, and wherein the atomizing means includes lean mixture heating means and heat sensitive means, whereby an ignition timing control means having a heat sensitive ignition time advance is provided and the heat sensitive means, the heat sensitive ignition timing advance means, and the ignition means are operatively connected such that the timings of the ignition means are varied in response to temperature changes in the fuel atomizing means.

6. The apparatus of claim 5, wherein means for advancing the ignition timing of the second ignition means during engine acceleration is provided.

7. The apparatus of claim 5, wherein said automatic means retards the ignition timing of a first one of said ignition means with respect to the ignition timing of the other ignition means.

8. The apparatus of claim 5, wherein said automatic means includes an advance mechanism which is operated in response to engine speed such that both of the ignition means are energized simultaneously under a relatively low engine speed while the ignition timing of a first one of said ignition means is advanced under medium and high speed engine operations at a greater rate than the ignition timing of the other ignition means so that the difference between the timings of the ignition means is increased in response to an increase in engine speed.

9. The apparatus of claim 5, wherein the automatic means includes means which increases the difference between the ignition timings of the respective ignition means in response to an increase in engine speed.

* * * * *